(12) United States Patent
Zhao et al.

(10) Patent No.: US 9,985,801 B2
(45) Date of Patent: May 29, 2018

(54) APPARATUS AND METHOD FOR ESTIMATING A FREQUENCY OFFSET, APPARATUS AND METHOD FOR ESTIMATING A CHANNEL SPACING AND SYSTEM

(71) Applicant: Fujitsu Limited, Kawasaki-shi, Kanagawa (CN)

(72) Inventors: Ying Zhao, Beijing (CN); Liang Dou, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 15/460,963

(22) Filed: Mar. 16, 2017

(65) Prior Publication Data
US 2017/0272279 A1    Sep. 21, 2017

(30) Foreign Application Priority Data

Mar. 18, 2016  (CN) .......................... 2016 1 0158230

(51) Int. Cl.
*H04L 25/02* (2006.01)
*H04L 7/00* (2006.01)
*H04L 25/08* (2006.01)
*H04L 25/03* (2006.01)

(52) U.S. Cl.
CPC .......... *H04L 25/022* (2013.01); *H04L 7/0033* (2013.01); *H04L 25/08* (2013.01); *H04L 2025/0377* (2013.01)

(58) Field of Classification Search
CPC ..... H04L 25/022; H04L 7/0033; H04L 25/08; H04L 2025/0377
See application file for complete search history.

(56) References Cited

U.S. PATENT DOCUMENTS

| | | | |
|---|---|---|---|
| 8,634,496 B2 * | 1/2014 | De Rore | H04L 25/0212 375/260 |
| 2004/0190438 A1 * | 9/2004 | Maltsev | H04L 27/266 370/206 |
| 2007/0002937 A1 * | 1/2007 | Min | H04B 1/708 375/150 |

(Continued)

*Primary Examiner* — Kenneth Lam
(74) *Attorney, Agent, or Firm* — Staas & Halsey LLP (57) ABSTRACT

Embodiments of this disclosure provide an apparatus and method for estimating a frequency offset, an apparatus and method for estimating a channel spacing and a system. The apparatus for estimating a frequency offset includes: a synchronization extracting unit configured to perform a training sequence synchronization extraction on a receiving sequence containing a periodic training sequence to obtain the training sequence; a delay correlation processing unit configured to parallelly perform autocorrelation operations of different delay amounts on the training sequence to obtain multiple parallel correlation sequences; a superimposition processing unit configured to perform a superimposition operation on the multiple parallel correlation sequences to obtain a single sequence; and a frequency offset estimating unit configured to determine a frequency offset according to a phase of a synchronization position of the single sequence in the training sequence. With the embodiments of this disclosure, anti-noise characteristic of the frequency offset estimation may be improved.

8 Claims, 5 Drawing Sheets

(56) References Cited

U.S. PATENT DOCUMENTS

| | | | |
|---|---|---|---|
| 2007/0147225 A1* | 6/2007 | Yu | H04L 27/0014 370/203 |
| 2010/0040044 A1* | 2/2010 | Izumi | H04L 7/042 370/350 |
| 2012/0027419 A1* | 2/2012 | Kaneda | H04B 10/516 398/158 |
| 2012/0033768 A1* | 2/2012 | Chang | H04L 27/2331 375/343 |
| 2016/0116599 A1* | 4/2016 | Turner | G01S 19/29 342/357.68 |
| 2017/0104643 A1* | 4/2017 | Zhao | H04L 7/0087 |
| 2017/0195155 A1* | 7/2017 | Zhang | H04L 5/0007 |

* cited by examiner

1401 a periodic training sequence is inserted into transmitting data to obtain a transmitting sequence; wherein, the periodic training sequence includes multiple repeated sub-sequences, the sub-sequences being connected in an end-to-end manner to constitute the periodic training sequence

APPARATUS AND METHOD FOR ESTIMATING A FREQUENCY OFFSET, APPARATUS AND METHOD FOR ESTIMATING A CHANNEL SPACING AND SYSTEM

CROSS-REFERENCE TO RELATED APPLICATIONS

This application claims the benefit of Chinese Application No. 201610158230.X, filed Mar. 18, 2016, in the Chinese Intellectual Property Office, the disclosure of which is incorporated herein by reference.

BACKGROUND

1. Field

This disclosure relates to the field of communication technologies, and in particular to an apparatus and method for estimating a frequency offset, an apparatus and method for estimating a channel spacing and a system.

2. Description of the Related Art

In an optical fiber communication system, carrier data are modulated in optical carriers. Under an ideal condition, wavelengths of lasers are stable, hence, carrier wavelengths are constant. However, in a practical system, as wavelengths of lasers are influenced by factors such as variation of driving currents, temperature fluctuation, and resonant cavity aging, etc., output carrier wavelengths drift in a certain range, embodied as frequency offsets of the carriers (frequency offsets). Such indefinite variation of frequency offsets will bring relatively large influence to the optical communication system, which is mainly embodied as: 1) making demodulation of the carrier data difficult; and 2) possibly introducing neighboring channel crosstalk into the multicarrier system. An effective method for estimating a frequency offset is effective means for solving the inherent frequency offset problem of the system.

Currently, a training sequence plays an important role in a high-speed optical fiber communication system. First, as optical fiber channels are not ideal, it is often needed to introduce a training sequence to assist the receiver in performing channel equalization. And what is more important is that the training sequence may further be used to assist in performing frequency offset estimation and compensation, so as to eliminate influence of inherent frequency offsets. In view of the important role of the training sequence in resisting the frequency offsets, an effective training sequence design and a frequency offset estimation method become keys in improving a performance of the transmission system. Under a nonideal condition, system noise is a key factor influencing the performance of frequency offset estimation of the training sequence, an effective training sequence design and a processing method may enhance anti-noise characteristic of the training sequence, and improvement of the anti-noise characteristic is not only beneficial to the frequency offset estimation, but also brings about enhancement of several functions of the training sequence, so that the whole system has a good communication performance.

It should be noted that the above description of the background is merely provided for clear and complete explanation of this disclosure and for easy understanding by those skilled in the art. And it should not be understood that the above technical solution is known to those skilled in the art as it is described in the background of the disclosure.

SUMMARY

Additional aspects and/or advantages will be set forth in part in the description which follows and, in part, will be apparent from the description, or may be learned by practice of the invention.

It was found by the inventors that solving the anti-noise problem of the training sequence is a basis for the training sequence design and the frequency offset estimation by the training sequence, and is also effective means for further optimizing the optical fiber communication system. During achieving enhancement of anti-noise of the frequency offset estimation by the training sequence, it is not desired to introduce extra hardware overhead. Hence, it is a starting point of this application that effective digital signal processing is performed at an optical receiver, the anti-noise characteristic of the training sequence is enhanced without introducing much complexity, and performance of the training sequence in frequency offset estimation is improved.

Embodiments of this disclosure provide an apparatus and method for estimating a frequency offset, an apparatus and method for estimating a channel spacing and a system. Using information in the optical receiver, the apparatus for estimating a frequency offset first performs a synchronization extraction on a training sequence with periodicity, and then enhances an anti-noise characteristic of the training sequence by using differentiation characteristic of multi-period correlation sequences, thereby outstandingly improving the anti-noise characteristic of the frequency offset estimation.

According to a first aspect of the embodiments of this disclosure, there is provided an apparatus for estimating a frequency offset, including:

a synchronization extracting unit configured to perform a training sequence synchronization extraction on a receiving sequence containing a periodic training sequence to obtain the training sequence;

a delay correlation processing unit configured to parallelly perform autocorrelation operations of different delay amounts on the training sequence to obtain multiple parallel correlation sequences;

a superimposition processing unit configured to perform a superimposition operation on the multiple parallel correlation sequences to obtain a single sequence; and a frequency offset estimating unit configured to determine a frequency offset according to a phase of a synchronization position of the single sequence in the training sequence.

According to a second aspect of the embodiments of this disclosure, there is provided an apparatus for estimating a channel spacing, including:

a frequency offset estimating unit configured to estimate a frequency offset of a center channel within a bandwidth range of a receiver and a frequency offset of a neighboring channel within the bandwidth range of the receiver to obtain the frequency offset of the center channel and the frequency offset of the neighboring channel; and a channel spacing estimating unit configured to estimate a channel spacing by using the frequency offset of the center channel and the frequency offset of the neighboring channel;

wherein, for the frequency offset of the center channel within the bandwidth range of the receiver, the frequency offset estimating unit performs training sequence synchronization extraction on a receiving sequence of the center channel containing a periodic training sequence to obtain the training sequence, parallelly performs autocorrelation operations of different delay amounts on the training sequence to obtain multiple parallel correlation sequences, performs superimposition operation on the multiple parallel correlation sequences to obtain a single sequence, and determines the frequency offset of the center channel according to a phase of a synchronization position of the single sequence in the training sequence;

and wherein, for the frequency offset of the neighboring channel within the bandwidth range of the receiver, the frequency offset estimating unit performs a training sequence synchronization extraction on a receiving sequence of the neighboring channel containing a periodic training sequence to obtain the training sequence, parallelly performs autocorrelation operations of different delay amounts on the training sequence to obtain multiple parallel correlation sequences, performs a superimposition operation on the multiple parallel correlation sequences to obtain a single sequence, and determines the frequency offset of the neighboring channel according to a phase of a synchronization position of the single sequence in the training sequence.

According to a third aspect of the embodiments of this disclosure, there is provided a receiver, including the apparatus as described in the first or the second aspect.

According to a fourth aspect of the embodiments of this disclosure, there is provided a communication system, including a transmitter and the receiver as described in the third aspect.

According to a fifth aspect of the embodiments of this disclosure, there is provided a method for estimating a frequency offset, including:

performing a training sequence synchronization extraction on a receiving sequence containing a periodic training sequence to obtain the training sequence;

parallelly performing autocorrelation operations of different delay amounts on the training sequence to obtain multiple parallel correlation sequences;

performing a superimposition operation on the multiple parallel correlation sequences to obtain a single sequence; and determining a frequency offset according to a phase of a synchronization position of the single sequence in the training sequence.

According to a sixth aspect of the embodiments of this disclosure, there is provided a method for estimating a channel spacing, including:

estimating a frequency offset of a center channel within a bandwidth range of a receiver and a frequency offset of a neighboring channel within the bandwidth range of the receiver to obtain the frequency offset of the center channel and the frequency offset of the neighboring channel; and estimating a channel spacing by using the frequency offset of the center channel and the frequency offset of the neighboring channel;

wherein, for the frequency offset of the center channel within the bandwidth range of the receiver, a training sequence synchronization extraction is performed on a receiving sequence of the center channel containing a periodic training sequence to obtain the training sequence, autocorrelation operations of different delay amounts are parallelly performed on the training sequence to obtain multiple parallel correlation sequences, a superimposition operation is performed on the multiple parallel correlation sequences to obtain a single sequence, and the frequency offset of the center channel is determined according to a phase of a synchronization position of the single sequence in the training sequence;

and wherein, for the frequency offset of the neighboring channel within the bandwidth range of the receiver, a training sequence synchronization extraction is performed on a receiving sequence of the neighboring channel containing a periodic training sequence to obtain the training sequence, autocorrelation operations of different delay amounts are parallelly performed on the training sequence to obtain multiple parallel correlation sequences, a superimposition operation is performed on the multiple parallel correlation sequences to obtain a single sequence, and the frequency offset of the neighboring channel is determined according to a phase of a synchronization position of the single sequence in the training sequence.

An advantage of the embodiments of this disclosure exists in that with the embodiments of this disclosure, the anti-noise characteristic of the frequency offset estimation is enhanced by calculating differentiation by using the multi-period correlation sequences, and such effective processing is beneficial to improvement of the transmission performance of the optical receiver, and provides instructions to production of optical receiver modules.

With reference to the following description and drawings, the particular embodiments of this disclosure are disclosed in detail, and the principles of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of this disclosure, which constitute a part of the specification and illustrate the exemplary embodiments of this disclosure, and are used for setting forth the principles of this disclosure together with the description. It is clear and understood that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Various implementations of this disclosure shall be described below with reference to the accompanying drawings.

Embodiment 1

An embodiment of this disclosure provides an apparatus for generating a transmitting sequence, configured in a transmitter in a communication system, for generating a transmitting sequence containing a periodic training sequence, so as to improve an anti-noise characteristic of the training sequence.

Figure 1:
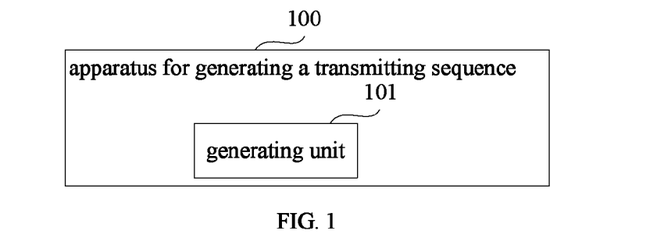
FIG. 1 is a schematic diagram of the apparatus for generating a transmitting sequence of Embodiment 1.

FIG. 1 is a schematic diagram of the apparatus 100 for generating a transmitting sequence. Referring to FIG. 1, the apparatus 100 includes: a generating unit 101 configured to insert a periodic training sequence into transmitting data to obtain a transmitting sequence. In this embodiment, the periodic training sequence includes multiple repeated sub-sequences, the sub-sequences being connected in an end-to-end manner to constitute the periodic training sequence.

Figure 2:
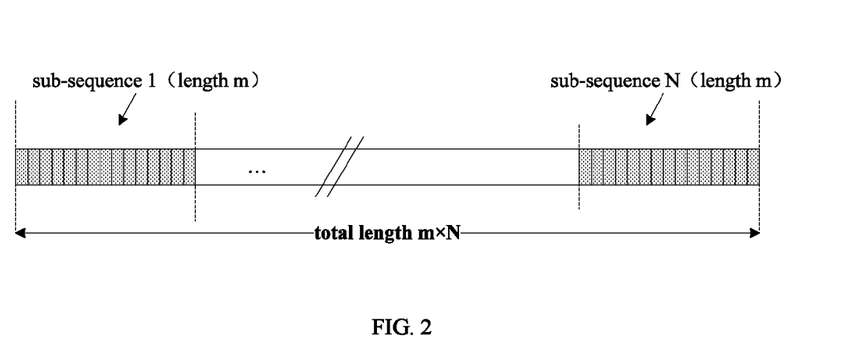
FIG. 2 is a schematic diagram of a structure of a periodic training sequence.

FIG. 2 is a schematic diagram of a structure of an implementation of the periodic training sequence. As shown in FIG. 2, in this implementation, the training sequence includes N repeated sub-sequences, the sub-sequences being connected in an end-to-end manner to constitute the periodic training sequence, and each sub-sequence containing m data symbols. N is not limited in this embodiment, which may be equal to 1, and may be preferably greater than 10. And m is also not limited in this embodiment. Hence, a periodic training sequence of a period m is constituted.

In this implementation, data may be inserted between the sub-sequences, and there may also be no data between the sub-sequences. If data are inserted, the periodicity of the sub-sequences needs to be ensured, that is, the inserted data need also possessing periodicity. And furthermore, structures of the sub-sequences are not limited in this embodiment, which may be conventional sequence structures, and may also be designed independently.

In this implementation, the periodic training sequence may be all of whole training sequence, and may also be a part of the whole training sequence. If the periodic training sequence is a part of the whole training sequence, a structure of a training sequence at another position is not limited in this embodiment. For example, the training sequence at another position may be periodic, and may also be aperiodic.

After generating the transmitting sequence by the apparatus of this embodiment, the transmitter may transmit the transmitting sequence in a conventional manner. Hence, a receiving sequence received by a receiver contains the periodic training sequence, and after being extracted, the periodic training sequence may be used for subsequent processing, such as channel spacing estimation, and channel equalization, etc.

With the design of the training sequence inserted into the transmitting data in this embodiment, an anti-noise performance of the system may be improved by using the periodical repetition characteristic. And a constraint of periodical repetition is only introduced, and freedom of design for the training sequence (sub-sequences) is kept to a great extent, which may facilitate achievement of other functions. Hence, viewing from the angle of flexible application, relatively sufficient design freedom is kept in the training sequence of such a structure.

Embodiment 2

An embodiment of this disclosure provides an apparatus for estimating a frequency offset, which is configured in a receiver, performs a synchronization extraction on a training sequence with periodicity by using information in the receiver, and then enhances an anti-noise characteristic of the training sequence by using differentiation characteristic of multi-period correlation sequences.

Figure 3:
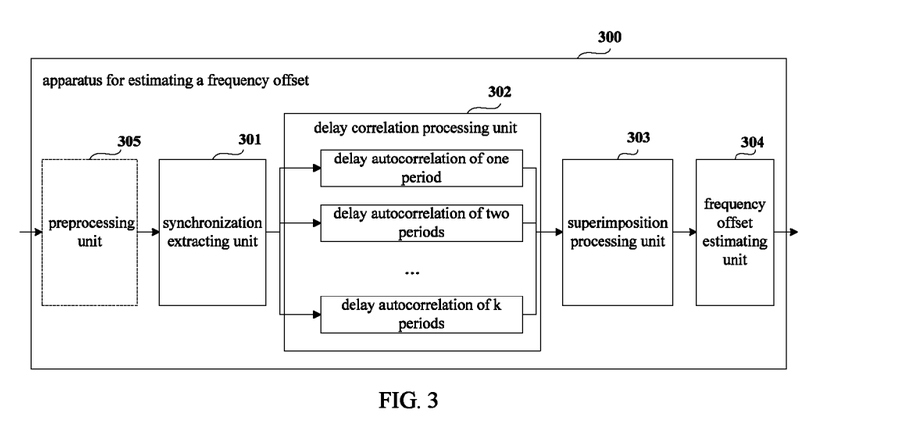
FIG. 3 is a schematic diagram of the apparatus for estimating a frequency offset of Embodiment 2.

FIG. 3 is a schematic diagram of the apparatus 300 for estimating a frequency offset. Referring to FIG. 3, the apparatus 300 includes: a synchronization extracting unit 301, a delay correlation processing unit 302, a superimposition processing unit 303 and a frequency offset estimating unit 304. The synchronization extracting unit 301 is configured to perform a training sequence synchronization extraction on a receiving sequence containing a periodic training sequence to obtain the training sequence. The delay correlation processing unit 302 is configured to parallelly perform autocorrelation operations of different delay amounts on the training sequence to obtain multiple parallel correlation sequences. The superimposition processing unit 303 is configured to perform a superimposition operation on the multiple parallel correlation sequences to obtain a single sequence. And the frequency offset estimating unit 304 is configured to determine a frequency offset of the above receiving sequence according to a phase of a synchronization position of the single sequence in the training sequence.

Figure 4:
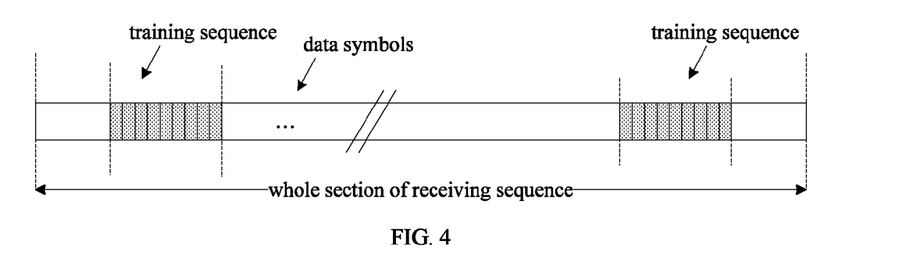
FIG. 4 is a schematic diagram of a structure of a receiving sequence.

In this embodiment, a signal received by the receiver (referred to as a receiving sequence in brief) is as shown in FIG. 4. In this embodiment, the training sequence occupies a small part of the receiving sequence, and as a position of the training sequence is unknown, the apparatus of the embodiment of this disclosure needs first to find out the training sequence and perform an extraction on the training sequence (i.e. synchronization), and then perform frequency offset estimation on the extracted training sequence. In this embodiment, the whole of the receiving sequence contains the periodic training sequence as described in Embodiment 1, the structure of which being incorporated herein, and being not going to be described herein any further.

In this embodiment, as shown in FIG. 3, alternatively, the apparatus 300 may further include a preprocessing unit 305, which is shown in a dotted block diagram in FIG. 3. The preprocessing unit 305 is configured to preprocess the receiving sequence containing the periodic training sequence to obtain the preprocessed receiving sequence and provide it to the extracting unit 301. In this embodiment, after the whole of the receiving sequence is obtained, the receiving sequence may be first preprocessed by the preprocessing unit 305, so as to selectively perform such processing as denoising, demultiplexing, and pre-equalization, etc.

In this embodiment, such existing operations as IQ imbalance elimination, polarization demultiplexing, out-of-band noise filtering, and pre-equalization, etc., may be taken into account in the preprocessing on the receiving sequence, which is not limited in this embodiment. A preprocessing method of the preprocessing unit 305 shall be described below by way of two examples.

Figure 5:
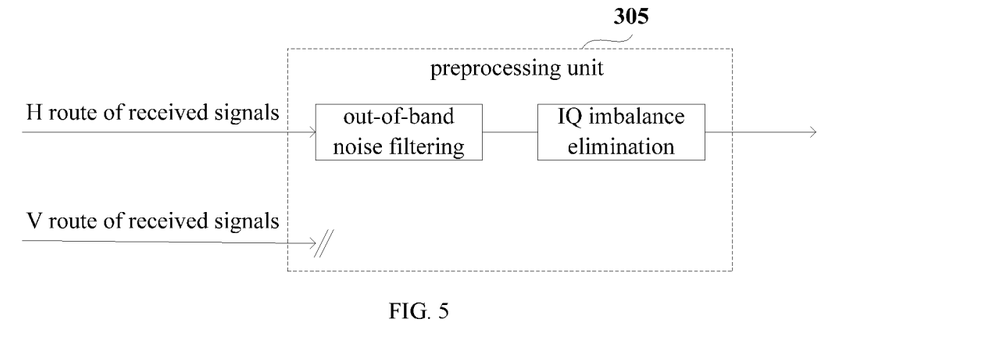
FIG. 5 is a schematic diagram of an implementation of a preprocessing unit.

FIG. 5 is a schematic diagram of an implementation of the preprocessing unit 305. As shown in FIG. 5, the received signals of the receiver are two routes, H and V routes, of signals. As synchronization information may only be extracted by one route of signal, one of the H route and the V route may be discarded. The reserved route of signal is taken as output of the preprocessing unit 305 after being performed out-of-band noise filtering and IQ imbalance elimination.

Figure 6:
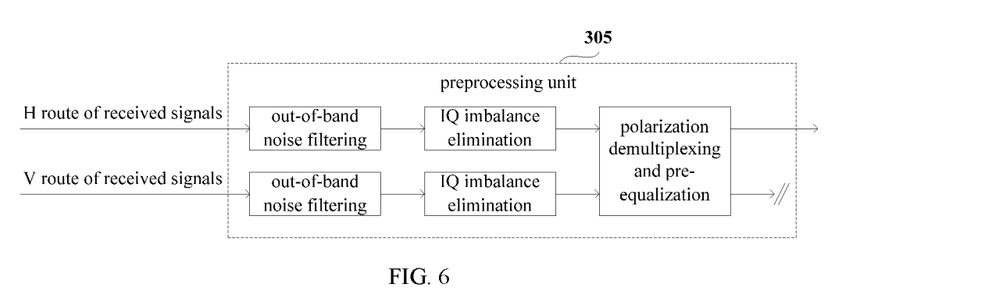
FIG. 6 is a schematic diagram of another implementation of a preprocessing unit.

FIG. 6 is a schematic diagram of another implementation of the preprocessing unit 305. As shown in FIG. 6, the received signals of the receiver are two routes, H and V routes, of signals. Out-of-band noise filtering, IQ imbalance elimination, polarization demultiplexing and pre-equalization may be performed in succession in the receiver, then one of the H route and the V route may be discarded. The reserved route of signal is taken as output of the preprocessing unit 305.

The preprocessing unit 305 is described above in brief by way of two examples only, and other methods for preprocessing the receiving sequence are not excluded in this embodiment. And in this embodiment, the preprocessing unit 305 is optional, and in particular implementation, the receiving sequence may not be preprocessed, and the above synchronization operation may directly be performed on the receiving sequence.

In this embodiment, the preprocessed signals (optional) or the signals directly received by the receiver are inputted into the synchronization extracting unit 301 for being performed synchronization, the training sequence is found in the whole of the receiving sequence and is extracted, and then outputted to the subsequent delay correlation processing unit 302.

In this embodiment, a synchronization method is not limited. For example, let the receiving signals be:

$$S_n = \tilde{S}(nT) \cdot \exp(j2\pi\Delta fnT + \varphi);$$

where, T is the symbol period, $\tilde{S}(nT)$ is the symbol sequence taking no frequency offset and phase noise into account, $\Delta f$ is a frequency offset, and $\varphi$ is phase noise (which is deemed as a constant value within a certain period of time).

Hence, the synchronization extracting unit 301 may obtain a position of the training sequence by calculating a delay autocorrelation of the receiving signals, that is, $$C_n = <S_n \cdot S^*_{n+m}>;$$

where, $<\cdot>$ denotes calculating a mean value, and $(\cdot)^*$ denotes a complex conjugate. The delay autocorrelation of m symbols on the receiving sequence is calculated in the above formula. As the training sequence takes m as a period, $C_n$ will accumulate a correlation peak value at the position of the training sequence, thereby the position of the training sequence may be determined. After the position of the training sequence is obtained, m×N symbols may be extracted based on this position and taken as a training sequence section $TS_n$, which is outputted to the subsequent delay correlation processing unit 302.

In this embodiment, after the extracted training sequence enters into the delay correlation processing unit 302, the delay correlation processing unit 302 may perform autocorrelation operations of different delay amounts in parallel on the training sequence, the delay amounts being integral multiples of the period m of the periodic training sequence, respectively. As shown in FIG. 3, the delay correlation processing unit 302 may perform delay autocorrelations of one period, two periods, . . . , k periods on the training sequence, respectively.

In this embodiment, if the extracted training sequence is expressed as $TS_n = \vec{\tilde{TS}}(nT) \cdot \exp(j2\pi\Delta fnT + \varphi)$, its delay autocorrelations of k periods may be expressed as:

$$C_n^k = <TS_n \cdot TS^*_{n+k\cdot m}> = <\vec{\tilde{TS}}(nT) \cdot \vec{\tilde{TS}}^*((n+k\cdot m)T)> \exp(j2\pi\Delta f \cdot k \cdot m \cdot T);$$

where, T is a symbol period, $<\cdot>$ denotes calculating a mean value, $(\cdot)^*$ denotes a complex conjugate, and k is a number of delay periods. As a total number of periods is N, k may be any value in an interval [1, N−1], and a value of k is not limited in this embodiment.

Noise items of the k delay correlation sequences parallelly calculated by the above formula are not correlated with each other, and by using such a characteristic, a frequency offset calculated by using k correlation sequences has a signal to noise ratio higher than that of a frequency offset calculated by using one correlation sequence only, hence, the anti-noise characteristic is better.

By parallelly performing autocorrelation operations of different delay amounts on the training sequence by the delay correlation processing unit 302, the characteristic of multi-period repetition of the training sequence is utilized to a maximum extent, thereby bringing improvement of the anti-noise characteristic.

In this embodiment, after the multi-period delay correlation operations, the parallel correlation sequences are inputted into the superimposition processing unit 303, which may perform superimposition on the correlation sequences, such as performing two-two differentiation operations on multiple sections of correlation sequences, so as to extract a constant phase difference introduced by the frequency offset. And on the other hand, noises may also be counteracted each other by processing by using multiple sections of sequences, so as to bring improvement of the anti-noise characteristic.

In this embodiment, a function of the superimposition processing unit 303 is to synthesize information on k correlation sequences, and calculate a single sequence used for estimating the frequency offset.

In an implementation, the superimposition processing unit 303 may use a complex superimposition algorithm, such as performing complex conjugate multiplication on two neighboring correlation sequences in the multiple parallel correlation sequences, and then adding up all values to obtain the single sequence.

This implementation is to use a principle that a phase difference between $C_n^i$ and $C_n^{i-1}$ is theoretically constant to perform complex co-phase superimposition, and the obtained single sequence $C_n$ is expressed as:

$$C_n = \sum_{i=1}^{k-1} C_n^{i+1} \cdot (C_n^i)^* = \exp(j2\pi\Delta fm \cdot T) \sum_{i=1}^{k-1} < \widetilde{TS}(n+(i+1)\cdot T) \cdot \widetilde{TS}^*((n+i \cdot m) \cdot T) >;$$

where, $C_n^{i+1}$ and $C_n^i$ are the two neighboring correlation sequences in the multiple parallel correlation sequences, k is the number of periods of the periodic training sequence, T is a symbol period, m is a period of sub-sequences in the periodic training sequence, Δf is a frequency offset, TS is an extracted training sequence, and ( )* denotes a complex conjugate operation.

The phase offset (phase difference) introduced by the frequency offset may also be extracted by using such a co-phase superimposition method, which is embodied as a phase of the complex $C_n$. As $C_n$ is obtained by superimposing multiple correlation sequences, the noise items may be counteracted each other, thereby improving the signal to noise ratio, and enhancing the anti-noise characteristic of the frequency offset estimation.

In this embodiment, the complex correlation sequences outputted by the superimposition processing unit 303 are inputted into the frequency offset estimating unit 304, and the phase difference introduced by the frequency offset may be extracted, thereby a frequency offset of the system may be calculated.

In this embodiment, the frequency offset estimating unit 304 obtains a frequency offset value based on the output of the superimposition processing unit 303, which is expressed as:

$$\Delta f = \frac{1}{2\pi \cdot m \cdot T} \text{ angle }(C_{sync});$$

where, angle($C_{sync}$) is the phase at the synchronization position sync of the single sequence $C_n$ in the training sequence, mT is the sub-sequence time period, and 2π is a constant.

With the apparatus of this embodiment, the anti-noise characteristic of the system is outstandingly improved by using the period training sequence, which may not only ensure the frequency offset estimation performance of the training sequence, but also reduce influence of non-ideal factors on the estimated value.

Embodiment 3

An embodiment of this disclosure provides an apparatus for estimating a channel spacing.

Within a bandwidth range of a receiver, in addition to a center channel needing to be demodulated, information on left and right neighboring channels received at the same time is also included. As a receiving bandwidth is limited, only parts of the information on the left and right neighboring channels are received. As frequency spectra of the neighboring channels are incomplete, a spacing between central wavelengths of two channels, that is, a channel spacing, cannot be directly judged. In this embodiment, frequency offsets of the two channels may be estimated respectively by using information on training sequences of the center channel and a neighboring channel, so as to estimate the channel spacing from a difference between the frequency offsets of the two channels.

Figure 7:
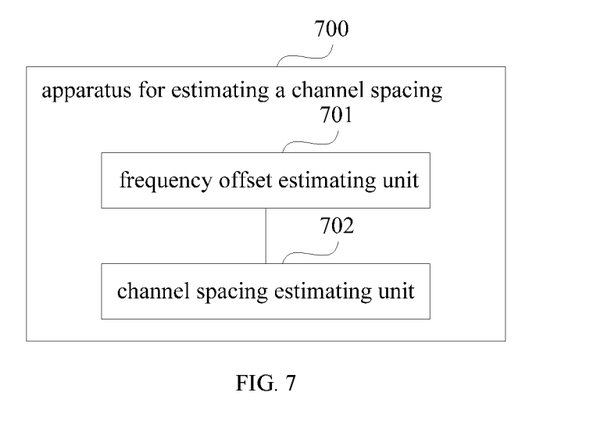
FIG. 7 is a schematic diagram of the apparatus for estimating a channel spacing of Embodiment 3.

FIG. 7 is a schematic diagram of the apparatus 700 for estimating a channel spacing. As shown in FIG. 7, the apparatus 700 includes a frequency offset estimating unit 701 and a channel spacing estimating unit 702.

The frequency offset estimating unit 701 is configured to estimate a frequency offset of a center channel within a bandwidth range of a receiver and a frequency offset of a neighboring channel within the bandwidth range of the receiver to obtain the frequency offset of the center channel and the frequency offset of the neighboring channel. In this embodiment, the frequency offset estimating unit 701 may be carried out by the apparatus 300 for estimating a frequency offset in Embodiment 2.

For example, for the frequency offset of the center channel within the bandwidth range of the receiver, the frequency offset estimating unit 701 may perform a training sequence synchronization extraction on a receiving sequence of the center channel containing a periodic training sequence to obtain the training sequence, parallelly perform autocorrelation operations of different delay amounts on the training sequence to obtain multiple parallel correlation sequences, performs a superimposition operation on the multiple parallel correlation sequences to obtain a single sequence, and determine the frequency offset of the center channel according to a phase of a synchronization position of the single sequence in the training sequence;

For another example, for the frequency offset of the neighboring channel within the bandwidth range of the receiver, the frequency offset estimating unit 701 may perform a training sequence synchronization extraction on a receiving sequence of the neighboring channel containing a periodic training sequence to obtain the training sequence, parallelly performs autocorrelation operations of different delay amounts on the training sequence to obtain multiple parallel correlation sequences, performs a superimposition operation on the multiple parallel correlation sequences to obtain a single sequence, and determines the frequency offset of the neighboring channel according to a phase of a synchronization position of the single sequence in the training sequence.

As the apparatus 300 for estimating a frequency offset is described in detail in Embodiment 2, the contents of which are incorporated herein, and shall not be described herein any further.

Figure 8:
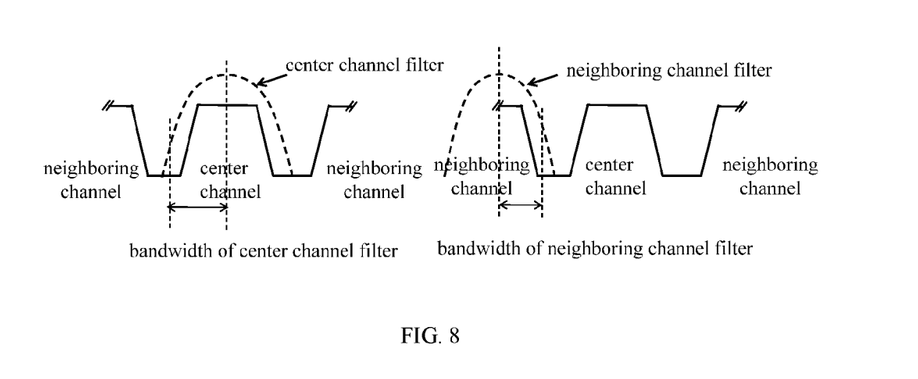
FIG. 8 is a schematic diagram of filtering of a center channel and a neighboring channel.

In this embodiment, based on the method used by the frequency offset estimating unit 701, as shown in FIG. 8, a filtering operation may be performed respectively on the center channel and the neighboring channel at the preprocessing unit 305 to eliminate out-of-band noises, so as to obtain the receiving sequence of the center channel and the receiving sequence of the neighboring channel. Thereafter, the synchronization processing and the frequency offset estimation processing are respectively performed on the receiving sequence of the center channel and the receiving sequence of the neighboring channel, so as to obtain the frequency offset of the center channel and the frequency offset of the neighboring channel. As the method for estimating a frequency offset proposed in this embodiment has a higher anti-noise characteristic, for a neighboring channel with smaller power, the method for estimating a frequency offset proposed in this embodiment shows a better noise tolerance relative to a conventional method, thereby benefiting the training sequence processing of the neighboring channel, and this is one of application examples that the method for estimating a frequency offset proposed in this embodiment has an enhanced anti-noise characteristic.

In this embodiment, the channel spacing estimating unit 702 may estimate a channel spacing by using the frequency offset of the center channel and the frequency offset of the neighboring channel, such as obtaining a channel spacing between the center channel and the neighboring channel through subtraction there between.

With the apparatus of this embodiment, the anti-noise characteristic of the system is outstandingly improved by using the period training sequence, which may not only ensure the frequency offset estimation performance of the training sequence, but also reduce influence of non-ideal factors on the estimated value.

Embodiment 4

Figure 9:
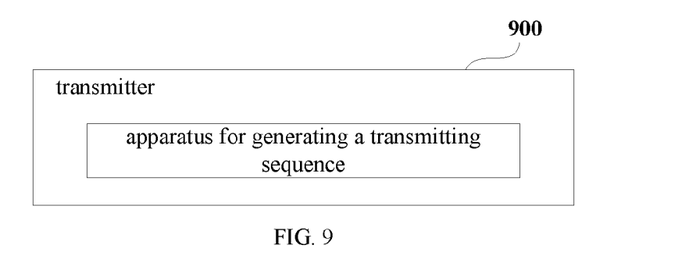
FIG. 9 is a schematic diagram of the transmitter of Embodiment 4.

An embodiment of this disclosure provides a transmitter. FIG. 9 is a schematic diagram of the transmitter. As shown in FIG. 9, the transmitter 900 includes the apparatus for generating a transmitting sequence as described in Embodiment 1. As the apparatus for generating a transmitting sequence has been described in detail in Embodiment 1, the contents of which are incorporated herein, and shall not be described herein any further.

Figure 10:
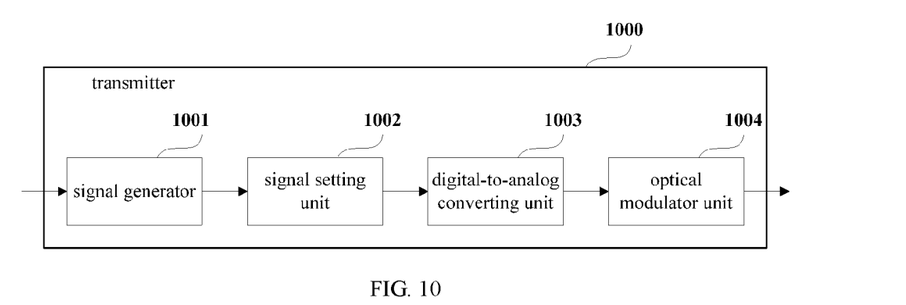
FIG. 10 is a schematic diagram of a systematic structure of the transmitter of Embodiment 4.

FIG. 10 is a schematic diagram of a systematic structure of the transmitter. As shown in FIG. 10, the transmitter 1000 includes a signal generator 1001, a signal setting unit 1002, a digital-to-analog converting unit 1003 and an optical modulator unit 1004.

The signal generator 1001 generates digital signals according to transmitting data, the signal setting unit 1002 superimposes a periodic training sequence in the generated digital signals, the digital-to-analog converting unit 1003 performs a digital-to-analog conversion on the digital signals, and the optical modulator unit 1004 takes the signals converted by the digital-to-analog converting unit 1003 as modulation signals to perform modulation.

In this embodiment, the signal setting unit 1002 may be carried out by the apparatus 100 for generating a transmitting sequence in Embodiment 1. The periodic training sequence is described in detail in Embodiment 1, and the contents of which are incorporated herein, and shall not be described herein any further.

The systematic structure of the transmitter shown in FIG. 10 is illustrative only, and in particular implementation, some components may be added or removed as demanded.

With the transmitter of this embodiment, the anti-noise characteristic of the system is outstandingly improved by inserting the period training sequence into the transmitting data, which may not only ensure the frequency offset estimation performance of the training sequence, but also reduce influence of non-ideal factors on the estimated value.

Embodiment 5

Figure 11:
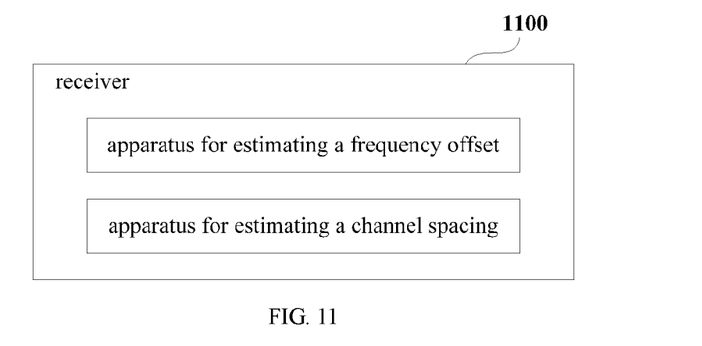
FIG. 11 is a schematic diagram of the receiver of Embodiment 5.

An embodiment of this disclosure further provides a receiver. FIG. 11 is a schematic diagram of the receiver. As shown in FIG. 11, the receiver 1100 includes the apparatus for estimating a frequency offset as described in Embodiment 2 and/or the apparatus for estimating a channel spacing as described in Embodiment 3. As the apparatus 300 for estimating a frequency offset and the apparatus 700 for estimating a channel spacing have been described in detail in Embodiment 2 and Embodiment 3, the contents of which are incorporated herein, and shall not be described herein any further.

Figure 12:
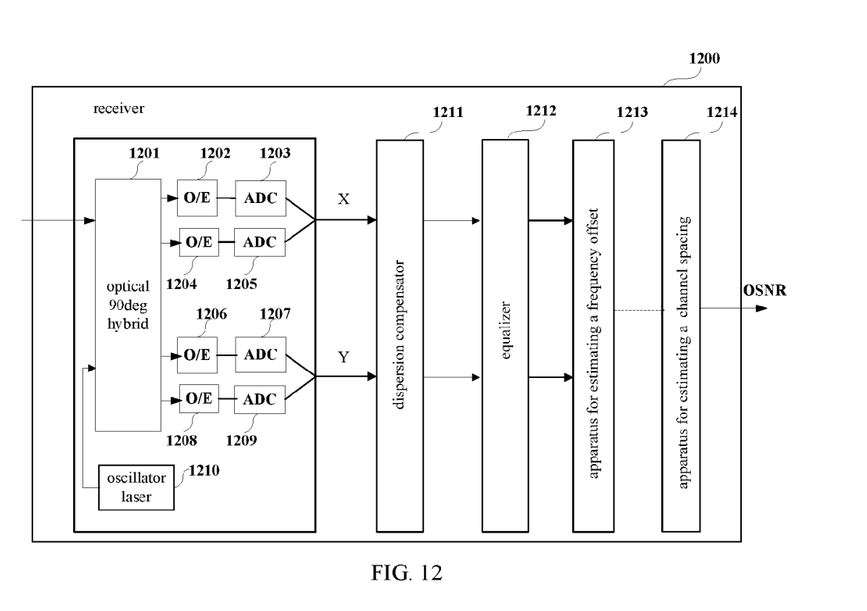
FIG. 12 is a schematic diagram of a systematic structure of the receiver of Embodiment 5.

FIG. 12 is a schematic diagram of a systematic structure of the receiver of the embodiment of this disclosure. As shown in FIG. 12, the receiver 1200 includes:

a front end configured to convert an inputted optical signal into baseband signals in two polarization states, in this embodiment, the two polarization states may include an H polarization state and a V polarization state.

As shown in FIG. 12, the front end includes an oscillator laser 1210, an optical 90 deg hybrid 1201, opto-electronic (O/E) detectors 1202, 1204, 1206 and 1208, analog-to-digital converters (ADCs) 1203, 1205, 1207 and 1209, a dispersion compensator 1211, an equalizer 1212 and an apparatus for estimating a frequency offset 1213 and/or an apparatus for estimating a channel spacing 1214; in this embodiment, the apparatus for estimating a frequency offset 1213 and the apparatus for estimating a channel spacing 1214 may have structures and functions identical to those described in Embodiment 2 and Embodiment 3, and shall not be described herein any further; the oscillator laser 1210 is configured to provide a local light source; an optical signal is converted into a baseband signal in a polarization state after passing through the optical 90 deg hybrid 1201, the opto-electronic (O/E) detectors 1202 and 1204 and the analog-to-digital converters (ADCs) 1203 and 1205; and the optical signal is converted into a baseband signal in the other polarization state after passing through the optical 90 deg hybrid 1201, the opto-electronic (O/E) detectors 1206 and 1208 and the analog-to-digital converters (ADCs) 1207 and 1209, with a detailed process being similar to that in the prior art, and being not going to be described herein any further.

Furthermore, if a frequency offset and phase noise have effects on estimation of an OSNR, the receiver 1200 may also include a frequency offset compensator and a phase noise compensator (not shown).

With the receiver of this embodiment, the anti-noise characteristic of the system is outstandingly improved by using characteristic of the period training sequence, which may not only ensure the frequency offset estimation performance of the training sequence, but also reduce influence of non-ideal factors on the estimated value.

Embodiment 6

Figure 13:
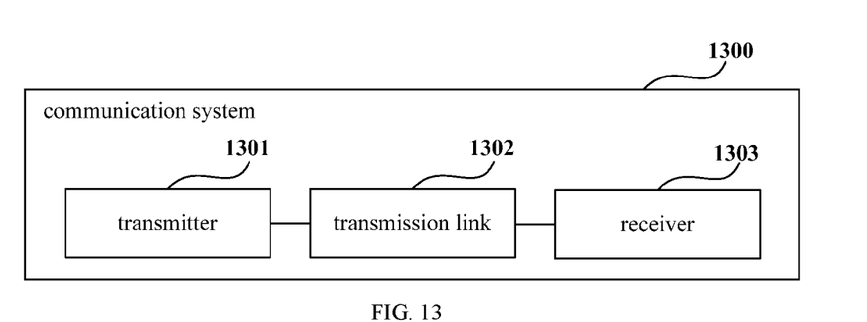
FIG. 13 is a schematic diagram of the communication system of Embodiment 6.

An embodiment of this disclosure further provides a communication system. FIG. 13 is a schematic diagram of the communication system of the embodiment. As shown in FIG. 13, the communication system 1300 includes a transmitter 1301, a transmission link 1302 and a receiver 1303. In this embodiment, a structure and functions of the transmitter 1301 are identical to those of Embodiment 4, and a structure and functions of the receiver 1303 are identical to those of Embodiment 5, which shall not be described herein any further; and the transmission link 1302 may have an existing structure and functions, which are not limited in the embodiment of this disclosure.

With the communication system of this embodiment, the anti-noise characteristic of the system is outstandingly improved by using characteristic of the period training sequence, which may not only ensure the frequency offset estimation performance of the training sequence, but also reduce influence of non-ideal factors on the estimated value.

Embodiment 7

An embodiment of this disclosure provides a method for generating a transmitting sequence, applicable to a transmitter in a communication system. As principles of the method are similar to that of the apparatus in Embodiment 1, the implementation of the apparatus in Embodiment 1 may be referred to for implementation of the method, with identical parts being not going to be described herein any further.

Figure 14:
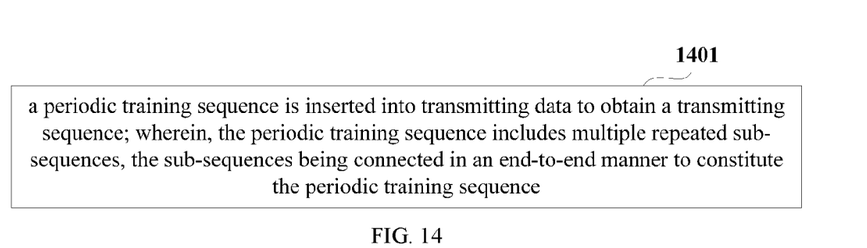
FIG. 14 is a schematic diagram of the method for generating a transmitting sequence of Embodiment 7.

FIG. 14 is a flowchart of the method for generating a transmitting sequence of the embodiment. Referring to FIG. 14, the method includes:

step 1401: a periodic training sequence is inserted into transmitting data to obtain a transmitting sequence; wherein, the periodic training sequence includes multiple repeated sub-sequences, the sub-sequences being connected in an end-to-end manner to constitute the periodic training sequence.

In this embodiment, the periodic training sequence may be a part of whole training sequence, and may also be all of the whole training sequence, only if it is ensured that the training sequence contains some sections of periodic sub-sequences.

In this embodiment, as the training sequence inserted into the transmitting data contains the periodic training sequence, the anti-noise characteristic of the system is outstandingly improved, which may not only ensure the frequency offset estimation performance of the training sequence, but also reduce influence of non-ideal factors on the estimated value.

Embodiment 8

An embodiment of this disclosure further provides a method for estimating a frequency offset, applicable to a receiver in a communication system. As principles of the method are similar to that of the apparatus in Embodiment 2, the implementation of the apparatus in Embodiment 2 may be referred to for implementation of the method, with identical parts being not going to be described herein any further.

Figure 15:
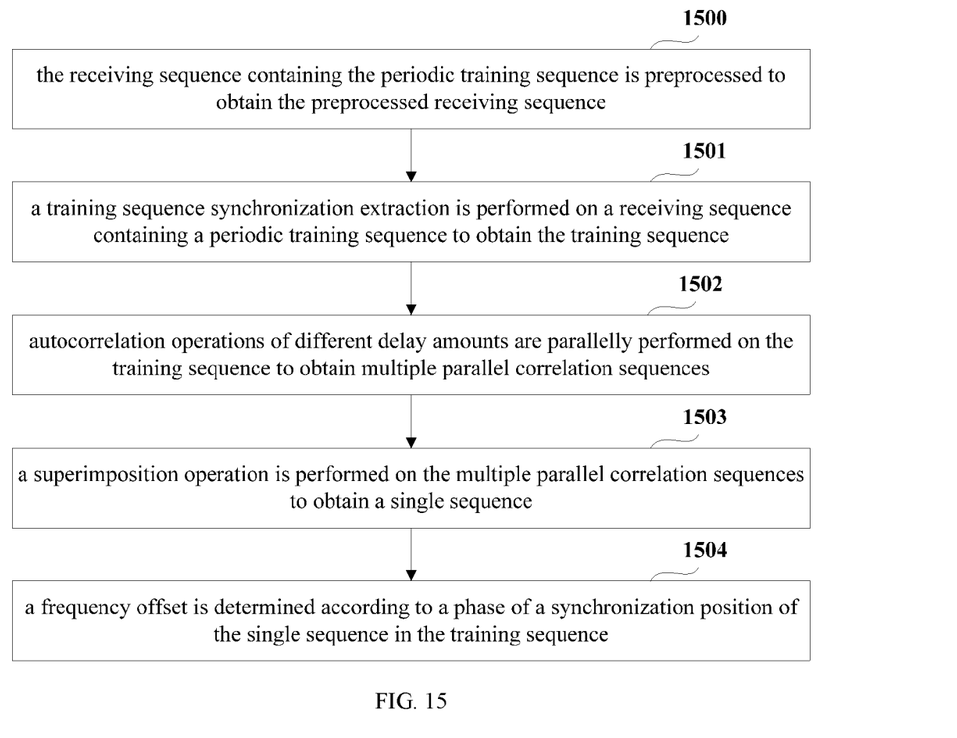
FIG. 15 is a schematic diagram of the method for estimating a frequency offset of Embodiment 8.

FIG. 15 is a flowchart of the method for estimating a channel spacing of the embodiment. Referring to FIG. 15, the method includes:

step 1501: a training sequence synchronization extraction is performed on a receiving sequence containing a periodic training sequence to obtain the training sequence;

step 1502: autocorrelation operations of different delay amounts are parallelly performed on the training sequence to obtain multiple parallel correlation sequences;

step 1503: a superimposition operation is performed on the multiple parallel correlation sequences to obtain a single sequence; and step 1504: a frequency offset is determined according to a phase of a synchronization position of the single sequence in the training sequence.

In step 1501, the different delay amounts are integral multiples of a period of the training sequence, respectively.

In step 1502, complex conjugate multiplication may be performed on two neighboring correlation sequences in the multiple parallel correlation sequences, and then all values may be added up to obtain the single sequence.

In step 1503, an expression of the single sequence may be:

$$C_n = \sum_{i=1}^{k-1} C_n^{i+1} \cdot (C_n^i)^* =$$

$$\exp(j2\pi\Delta fm \cdot T)\sum_{i=1}^{k-1} <\vec{TS}(n+(i+1)\cdot T)\cdot \vec{TS}^*((n+i\cdot m)\cdot T)>.$$

In step 1504, an expression of the frequency offset may be:

$$\Delta f = \frac{1}{2\pi \cdot m \cdot T} \text{ angle } (C_{sync}).$$

In this embodiment, before step 1501, the method may further include:

step 1500: the receiving sequence containing the periodic training sequence is preprocessed to obtain the preprocessed receiving sequence.

With the method of this embodiment, the anti-noise characteristic of the system is outstandingly improved by using characteristic of the period training sequence, which may not only ensure the frequency offset estimation performance of the training sequence, but also reduce influence of non-ideal factors on the estimated value.

Embodiment 9

An embodiment of this disclosure further provides a method for estimating a channel spacing, applicable to a receiver in a communication system. As principles of the method are similar to that of the apparatus in Embodiment 3, the implementation of the apparatus in Embodiment 3 may be referred to for implementation of the method, with identical parts being not going to be described herein any further.

Figure 16:
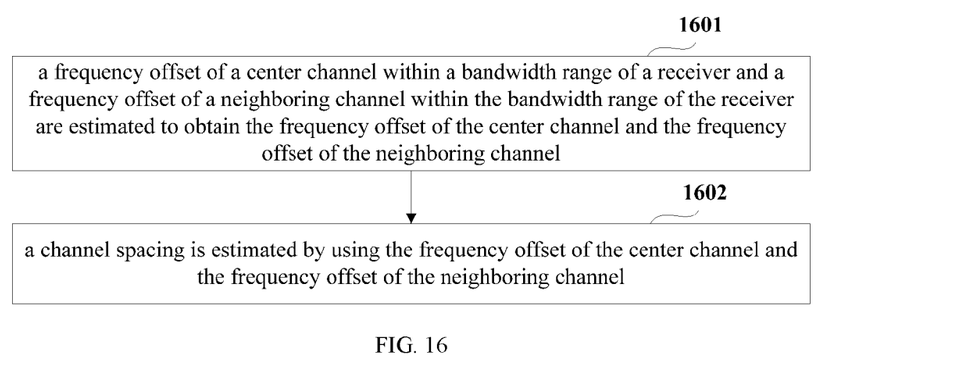
FIG. 16 is a schematic diagram of the method for estimating a channel spacing of Embodiment 9.

FIG. 16 is a flowchart of the method for estimating a channel spacing of the embodiment. Referring to FIG. 16, the method includes:

step 1601: a frequency offset of a center channel within a bandwidth range of a receiver and a frequency offset of a neighboring channel within the bandwidth range of the receiver are estimated to obtain the frequency offset of the center channel and the frequency offset of the neighboring channel; and step 1602: a channel spacing is estimated by using the frequency offset of the center channel and the frequency offset of the neighboring channel.

In this embodiment, step 1601 may be carried out by the method of Embodiment 8, the contents of which being incorporated herein, and being not going to be described herein any further.

With the method of this embodiment, the anti-noise characteristic of the system is outstandingly improved by using characteristic of the period training sequence, which may not only ensure the frequency offset estimation performance of the training sequence, but also reduce influence of non-ideal factors on the estimated value.

An embodiment of the present disclosure provides a computer readable program code, which, when executed in a transmitter, will cause the transmitter to carry out the method as described in Embodiment 7.

An embodiment of the present disclosure provides a computer readable medium, including a computer readable program code, which will cause a transmitter to carry out the method as described in Embodiment 7.

An embodiment of the present disclosure provides a computer readable program code, which, when executed in a receiver, will cause the receiver to carry out the method as described in Embodiment 8 or Embodiment 9.

An embodiment of the present disclosure provides a computer readable medium, including a computer readable program code, which will cause a receiver to carry out the method as described in Embodiment 8 or Embodiment 9.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principles of the present disclosure, and such variants and modifications fall within the scope of the present disclosure.

What is claimed is:

1. An apparatus for estimating a frequency offset, comprising:
   a memory that stores a plurality of instructions; and
   a processor coupled to the memory and configured to execute the instructions to:
   perform a training sequence synchronization extraction on a receiving sequence containing a periodic training sequence to obtain the training sequence;
   parallelly perform autocorrelation operations of different delay amounts on the training sequence to obtain multiple parallel correlation sequences;
   perform a superimposition operation on the multiple parallel correlation sequences to obtain a single sequence; and
   determine a frequency offset according to a phase of a synchronization position of the single sequence in the training sequence,
   wherein the processor is configured to execute the instructions to perform complex conjugate multiplication on two neighboring correlation sequences in the multiple parallel correlation sequences, and then add up all values to obtain the single sequence.

2. The apparatus according to claim 1, wherein the different delay amounts are integral multiples of a period of the training sequence, respectively.

3. The apparatus according to claim 1, wherein an expression of the single sequence is:

$$C_n = \sum_{i=1}^{k-1} C_n^{i+1} \cdot (C_n^i)^* =$$

-continued $$\exp(j2\pi\Delta fm \cdot T)\sum_{i=1}^{k-1} <\widetilde{TS}(n+(i+1)\cdot T)\cdot \widetilde{TS}^*((n+i\cdot m)\cdot T)>;$$

where, $C_n^{i+1}$ and $C_n^i$ are the two neighboring correlation sequences in the multiple parallel correlation sequences, k is the number of periods of the periodic training sequence, T is a symbol period, m is a period of sub-sequences in the periodic training sequence, $\Delta f$ is a frequency offset, TS is an extracted training sequence, and ( )* denotes a complex conjugate operation.

4. The apparatus according to claim 3, wherein the processor is configured to execute the instructions to divides the phase at the synchronization position of the single sequence in the training sequence by a sub-sequence time period to obtain the frequency offset:

$$\Delta f = \frac{1}{2\pi \cdot m \cdot T} \text{ angle } (C_{sync});$$

where, angle($C_{sync}$) is the phase at the synchronization position sync of the single sequence $C_n$ in the training sequence, $2\pi$ is a constant, and mT is the sub-sequence time period.

5. The apparatus according to claim 1, wherein the apparatus further comprises:
   a preprocessor configured to preprocess the receiving sequence containing the periodic training sequence to obtain the preprocessed receiving sequence and provide it to the processor.

6. An apparatus for estimating a channel spacing, comprising:
   a memory that stores a plurality of instructions; and
   a processor coupled to the memory and configured to execute the instructions to:
   estimate a frequency offset of a center channel within a bandwidth range of a receiver and a frequency offset of a neighboring channel within the bandwidth range of the receiver to obtain the frequency offset of the center channel and the frequency offset of the neighboring channel; and
   estimate a channel spacing by using the frequency offset of the center channel and the frequency offset of the neighboring channel;
   wherein, for the frequency offset of the center channel within the bandwidth range of the receiver, the processor is configured to execute the instructions to performs a training sequence synchronization extraction on a receiving sequence of the center channel containing a periodic training sequence to obtain the training sequence, parallelly performs autocorrelation operations of different delay amounts on the training sequence to obtain multiple parallel correlation sequences, performs a superimposition operation on the multiple parallel correlation sequences to obtain a single sequence, and determines the frequency offset of the center channel according to a phase of a synchronization position of the single sequence in the training sequence;
   and wherein, for the frequency offset of the neighboring channel within the bandwidth range of the receiver, the processor is configured to execute the instructions to performs training a sequence synchronization extraction on a receiving sequence of the neighboring channel containing a periodic training sequence to obtain the training sequence, parallelly performs autocorrelation operations of different delay amounts on the training sequence to obtain multiple parallel correlation sequences, performs a superimposition operation on the multiple parallel correlation sequences to obtain a single sequence, and determines the frequency offset of the neighboring channel according to a phase of a synchronization position of the single sequence in the training sequence.

7. A receiver, comprising an apparatus for estimating a frequency offset, wherein the apparatus for estimating a frequency offset comprises:
a memory that stores a plurality of instructions; and
a processor coupled to the memory and configured to execute the instructions to:
perform a training sequence synchronization extraction on a receiving sequence containing a periodic training sequence to obtain the training sequence;
parallelly perform autocorrelation operations of different delay amounts on the training sequence to obtain multiple parallel correlation sequences;
perform a superimposition operation on the multiple parallel correlation sequences to obtain a single sequence;
and determine a frequency offset according to a phase of a synchronization position of the single sequence in the training sequence,
wherein the processor is configured to execute the instructions to:
perform complex conjugate multiplication on two neighboring correlation sequences in the multiple parallel correlation sequences, and then add up all values to obtain the single sequence.

8. The receiver according to claim 7, wherein the different delay amounts are integral multiples of a period of the training sequence, respectively.

* * * * *